US005618147A

United States Patent [19]

Bandura et al.

[11] Patent Number: 5,618,147

[45] Date of Patent: Apr. 8, 1997

[54] WICKET WIRE HOLDER

[75] Inventors: Vitaly Bandura, Danvers; Daniel W. Woodman, Jr., Beverly, both of Mass.

[73] Assignee: Battenfeld Gloucester Engineering Co., Inc., Gloucester, Mass.

[21] Appl. No.: 337,071

[22] Filed: Nov. 10, 1994

[51] Int. Cl.[6] .................................................... B65G 57/00

[52] U.S. Cl. ............................ 414/27; 414/908; 206/554; 211/57.1; 271/903

[58] Field of Search ............................ 414/27, 908, 923; 271/220, 903; 211/50, 57.1; 53/572; 206/554; 383/37

[56] References Cited

U.S. PATENT DOCUMENTS

| | | | |
|---|---|---|---|
| 3,472,388 | 10/1969 | Blase | 211/57.1 |
| 3,555,977 | 1/1971 | Saumsiegle | 414/27 |
| 3,770,134 | 11/1973 | Kupcikevicius | 211/57.1 |
| 3,777,930 | 12/1973 | Ericson et al. | 211/57.1 |
| 4,286,907 | 9/1981 | Houle et al. | 414/27 |
| 4,519,509 | 5/1985 | Nausedas | 211/57.1 |
| 4,662,864 | 5/1987 | Lehmacher | 493/204 |
| 4,796,499 | 1/1989 | Achelpohl | 414/27 |
| 5,232,325 | 8/1993 | Kohn et al. | 414/27 |

*Primary Examiner*—Karen B. Merritt
*Assistant Examiner*—Douglas Hess

[57] ABSTRACT

A sideweld bag making machine equipped with a rotary bag transfer device and wicket conveyer utilizes a modified wicket stacking plate and transfer wicket pins to effectively place the bags on permanent wickets as they are stacked on the wicket conveyer. Stacking bags directly onto this permanent wire wicket avoids the need for the operator to transfer the stacked and counted bags from transfer wicket pins to permanent wire wickets as part of the bag packing operation.

12 Claims, 5 Drawing Sheets

WICKET WIRE HOLDER

BACKGROUND OF THE INVENTION

1. Field of the Invention

This invention pertains to a mechanism for forming an aligned stack of plastic bags on a permanent wicket wire in a plastic bag machine having a rotary bag transfer mechanism and a wicketing conveyer.

2. Prior Art

It has been found desirable to produce counted stacks of open topped bags supported on U or staple shaped wires referred to as wickets. The bags retained on these wickets are commonly used in automatic bag loading equipment.

Numerous types of bag making machines intended to deposit the completed bags on upstanding pins are known, e.g. see U.S. Pat. No. 3,555,977 and U.S. Pat. No. 4,286,907. It is current practice, however, to utilize rotary transfer type wicketing devices to deposit bags on transfer wicket pins. As described in U.S. Pat. No. 3,555,977 wicket conveyers currently utilize a hollowed out or grooved wicket transfer pin. This hollowed pin enables the operator to insert the permanent wire wicket along side the pins and through the apertures in the bag lips to simultaneously remove the stack bags from the transfer wicket pins and place them on their permanent wire wicket. This removal operation is a fairly slow process, and, if the operator is not careful, can lead to disruption in the alignment of the stacked bags.

It is therefore an object of the present invention to provide a new and improved wicket stacking station that will carry permanent wire wickets as well as transfer wicket pins, so that bag machine operators will not have to transfer stacks of counted and aligned bags from transfer wicket pins to permanent wire wickets. It is a further object of the present invention to provide such a device that can be retrofitted to existing wicket conveyers to permit the stacking of sideweld plastic bags on permanent wickets, therefore avoiding the transfer of the completed stack of bags from the transfer wicket pins to permanent wickets.

SUMMARY OF THE INVENTION

In accordance with the present invention there is provided an improved wicket pin stacking assembly comprising of a) a wicket stacking plate, b) two upstanding transfer wicket pins having hollowed out sections adapted to receive a permanent wire wicket, c) means for mounting said wicket pins to said wicket plate, d) biasing means mounted on said mounting means adapted to hold a permanent wire wicket in said hollowed out sections of said transfer wicket pins.

DESCRIPTION OF THE PREFERRED EMBODIMENT

Figure 1:
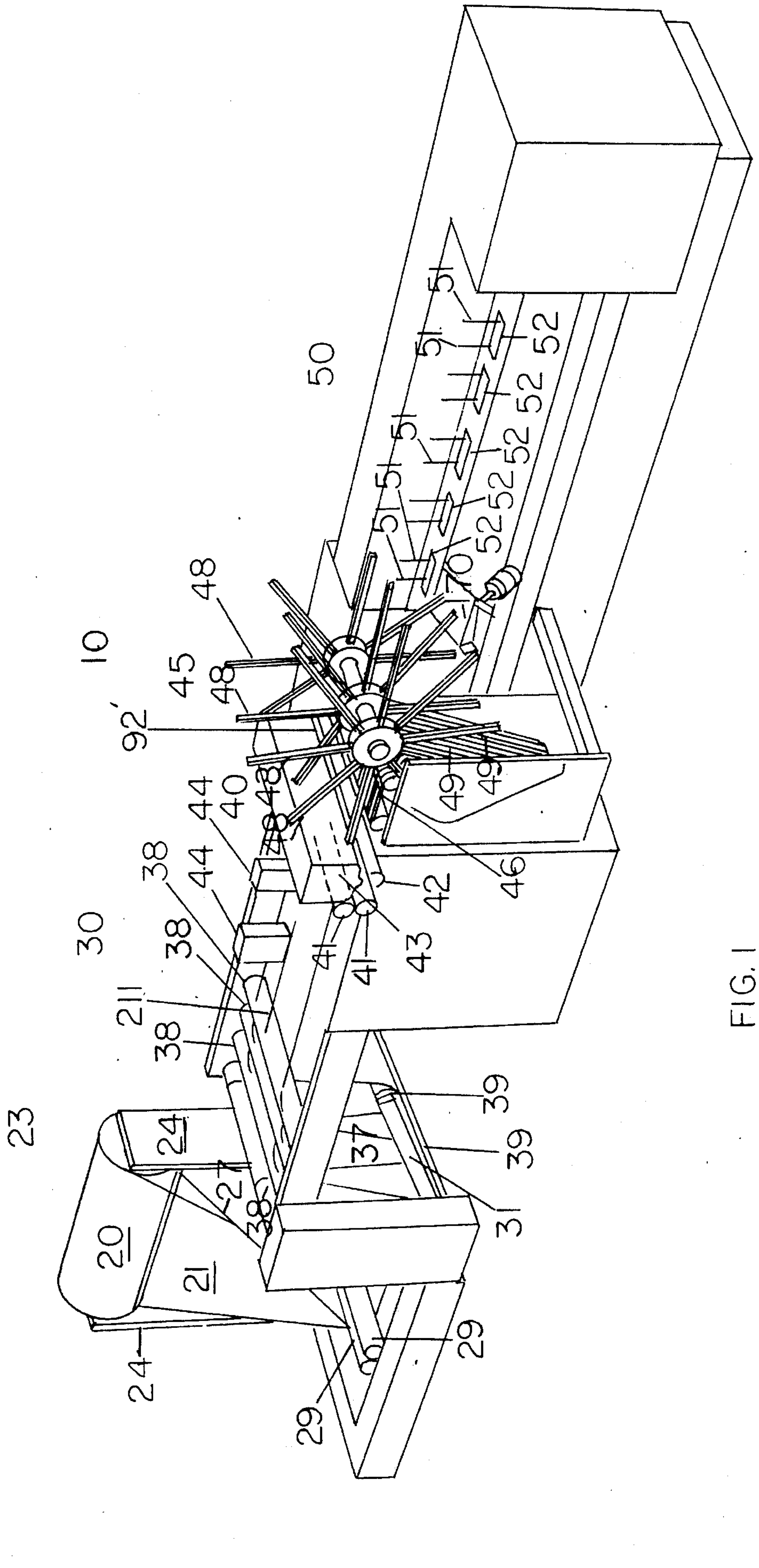
FIG. 1 shows an overall view of a sideweld bag making machine having a rotary transfer device and wicket conveyer utilizing a permanent wicket wire holder according to the present invention.

A typical sideweld bag making machine 10 having a rotary transfer device 45 and wicket conveyer 50 utilizing a movable bag stacking and abutment apparatus 170 is shown in FIG. 1. The bag making machine itself is preceded by a large roll of plastic film 20 mounted on supports 24 in unwind stand 23. Film 21 is drawn off roll 20 and over folding frame 27, through creasing rolls 29 and into bag machine 10. Film 21 is aligned with folding frame 27 in such a manner that edges 210 and 211 of film 21 are not placed directly on top of each other. Rather, there is a transverse displacement of edge 210 with respect to edge 211 so as to provide a lip 91 in finished bag 90 through which openings will be placed and through which transfer wicket pins 51 will pass as the bag is stacked on wicket conveyer 50.

Bag machine 10 is of the known type, having a compensation section 30, a sealing section 40, a transfer section 45, and a wicket conveyer section 50. Film 21 is drawn into compensation section 30 by capstan rolls 36, not shown in FIG. 1. After the capstan rolls 36, film is alternately passed under and over a series of fixed rolls 38 and movable rolls 39 mounted on an elastically biased arm assembly 31, said series of fixed and movable rolls comprising a film accumulation device 37. Modeen high speed bag making machines such as the machine shown as 10 in FIG. 1 may also have a single roll anti-bounce assembly 32 after film accumulation device 37, although no such assembly is shown on the bag machine of FIG. 1. Following the accumulation device, the film passes towards draw rolls 41, through compensation section 30 wherein a series of hole punches 44 are installed. Hole punches 44 are used to form openings 93 in film. 21 through which the transfer wicket pins 51 on wicket conveyer section 50 eventually will pass. As previously described, openings 93 are located in the transversely displaced portion of the web that will be the lip 91 of finished bag 90.

Figure 2:
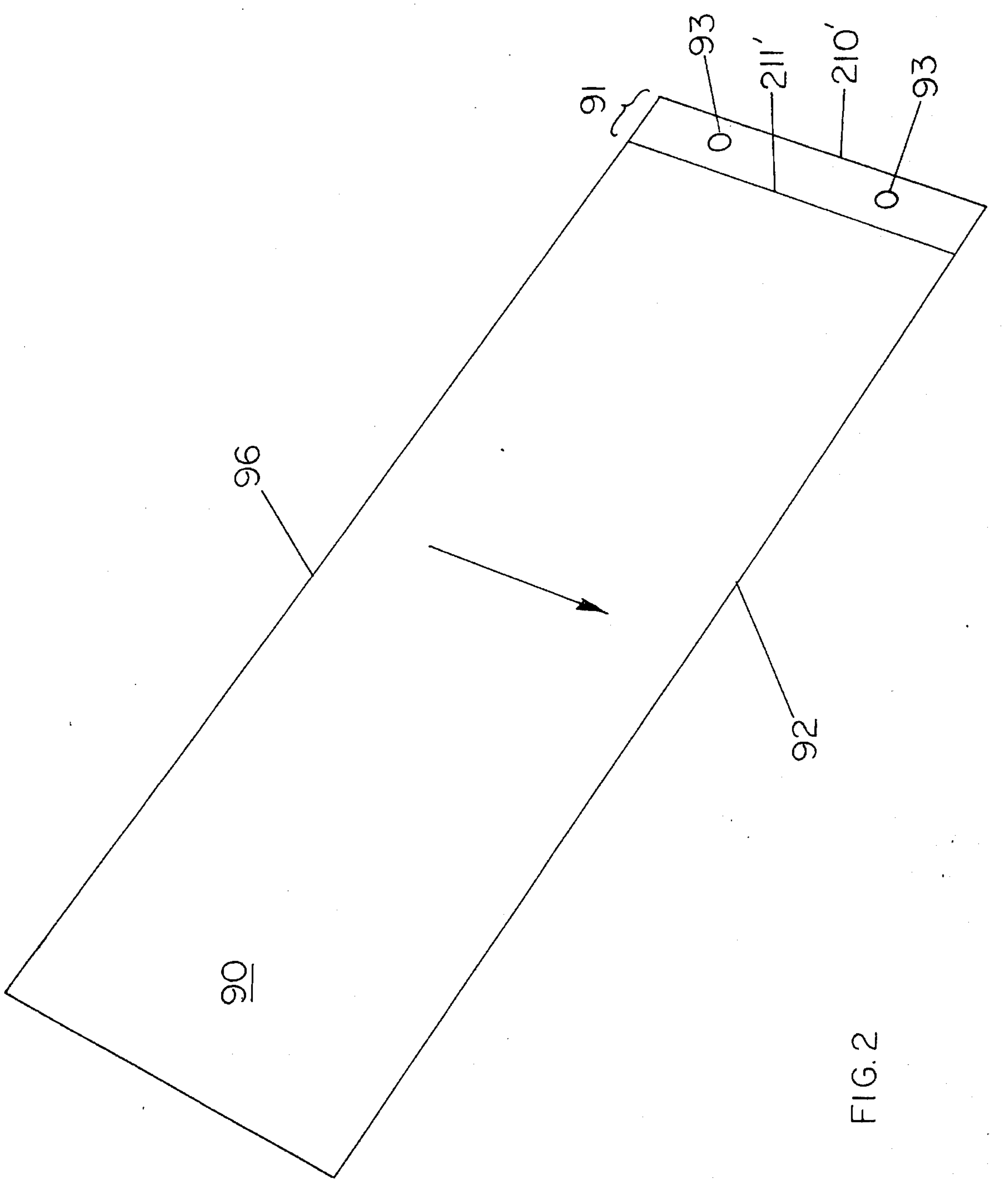
FIG. 2 shows a typical configuration of a wicketed sideweld bag.

For reference purposed, FIG. 2. shows a bag of the type that would preferably be used in conjunction with this present invention, i.e. a generic wicketed bag. Bag 90, is a lip type bag having openings 93 in the lip 91 of the bag. Lip 91 is formed between the displaced edges 210 and 211 of folded film 21. These displaced edges in furnished bag 90 are identified as 210' and 211'. Also shown in FIG. 2 is a reference arrow showing this direction of film advance through the machine. Finished bag 90 also has a leading edge seal 92 and a trailing edge seal 96.

As shown in FIG. 1, sealing section 40 contains draw rolls 41, sealing roll 42, hot knife 43, and their associated drive mechanisms. Although the present invention can be used on all known bag making machines equipped with rotary transfer devices 45, it is preferably used on modern bag making machines in which draw rolls 41 are driven by a numerically controlled servo-drive, and in which the hot knife 43 is driven by a stepping motor drive system. Draw rolls 41 are used to advance a length of folded film 21 corresponding to the width of the desired finished bag. Once this length of folded film has been advanced, hot knife 43 descends upon folded film 21 which is supported on sealing roll 42. The hot knife melts through the folded film, simultaneously severing folded film 21 and forming the trailing edge seal 96 on bag 90 and forming the leading edge seal 92 on folded film 21. Seal 92 will be the leading edge seal 92 on the next bag to be produced at sealing station 40.

Upon advance of folded film 21 by draw rolls 41, the leading edge of folded web 21 containing leading edge seal 92' is advanced onto either a rope conveyer 46 as shown in FIG. 1, or onto a metal grid that serves as the pickup position of transfer section 45. A rope conveyer is schematically illustrated in FIG. 1. The locations of the individual ropes 49 in the conveyer 46, as well as the conveyer mechanical structure, are selected to provide a relatively uniform support surface for the bag, but with necessary openings or channels 47 to permit passage of the individual arms 48 of rotary transfer device 45.

In operation, draw rolls 41 deliver the sealed end of the film onto the rope conveyer 46, the hot knife 43 descends on the folded film 21 separating the material on the conveyer from the balance of the film 21 and simultaneously sealing the trailing edge of the material on the conveyer to form a completed bag 90 and forming the leading edge seal 92 on the folded film 21 in anticipation of formation of the next bag. Shortly after the sealing and severing of the material on the seal roll 42, a series of parallel and aligned transfer arms 48 on rotary transfer device 45 will pass through the open channels 47 in rope conveyer 46 and contact the bag 90 from beneath. The surfaces of the transfer arms 48 that contact the bag 90 have a series of ports, not shown in FIG. 1, that are connected through the structure of the rotary transfer device 45 to a source of vacuum. This vacuum, when applied to the bag through the ports in the transfer arms 48, hold the bag securely in place on the rotary transfer arms 48. Rotary transfer device 45 as shown in FIG. 1 has eight sets of transfer arms 48. In practice, while eight sets of transfer arms 48 are frequently used, other numbers of arms can also be used. Also, while three transfer arms 48 as shown in FIG. 1 comprise each set as is customary for long bags, rotary transfer device 45 can have as few as two transfer arms 48 per set, or any number greater than three as required by the particular bag geometry.

Transfer arms 48 pick up a bag 90 at rope conveyer 46 as previously described, and carry it to a stacking station equipped with one or more largely vertical sets of transfer wicket pins 51 mounted on a stacking plate 52 attached to an indexing conveyer not shown in FIG. 1. Transfer wicket pins 51 are largely circular cross-section bluntly pointed pins grooved to receive wicket wire 54. Held within hollows of the face of transfer wicket pins 51 are wire wickets 54. As the transfer arms 48 carrying the bag away from rope conveyer 46 continue to rotate, they will eventually deposit the bag 90 onto transfer wicket pins 51 and the embedded wire wickets 54, with the pins 51 and wire wickets 54 passing through the previously punched openings 93 along the bag lip 91. As the bags are passing over transfer wicket pins 51 and wicket wires 54, transfer arms 48 carrying the bag 90 are disconnected from the source of vacuum. The lack of vacuum releases the bag from the arm, and the bag drops to stacking plate 52 at the base of transfer wicket pins 51 and wicket wires 54.

Referring again to FIG. 1, wicket conveyer section 50 is essentially of the customary configuration, having a single indexing conveyer with the individual stacking plates 52 mounted thereon. Each stacking plate 52 will in turn have one or more upstanding transfer wicket pins 51 mounted thereon over which bags 90 will be deposited as they are stacked. As described in more detail below, however, permanent wicket wires 54 are held within hollowed sections of transfer wicket pins 51. Conveyer section 50 is located within the path of arms 48 on rotary transfer device 45, but nearer the arm that carries the top of the bag, i.e. having lip 91 with openings 93. As the transfer device 45 continues to rotate, punched openings 93 in bag 90 will pass over the upstanding transfer wicket pins 51 and with continued rotation will slide down the pins 51 and be stripped from the rotary transfer device, with the bag being deposited on the surface of stacking plate 52 and abutment apparatus 170. To aid in stripping the bag from rotary transfer device 45, it is also customary to disconnect transfer arms 48 from the source of vacuum as the bag 90 begins to slide over the transfer wicket pins 51.

Manufacture and delivery of the bags onto transfer wicket pins 51 and embedded wicket wire 54 will continue until a preselected number of bags corresponding to the desired number of bags in each stack has been produced at the sealing section 40. At that time, the sealing section 40 of the bag machine 10 will pass through one or more idle cycles, i.e. no material is delivered by draw rolls 41 to hot knife 43 and seal roll 42, to enable the wicket conveyer to ultimately index the fully formed stack of bags from the stacking station and present a new set of transfer wicket pins 51 with embedded wire wicket 54 on stacking plate 52 for collecting the next set of bags at the stacking station without interference from newly formed bags. Since rotary transfer device 45 has one or more bags in transit from sealing section 40 to stacking station at any given time, indexing of wicket conveyer is delayed until such time as the last of the counted bags is delivered to transfer wicket pins 51 and their embedded wicket wire 54.

Figure 3:
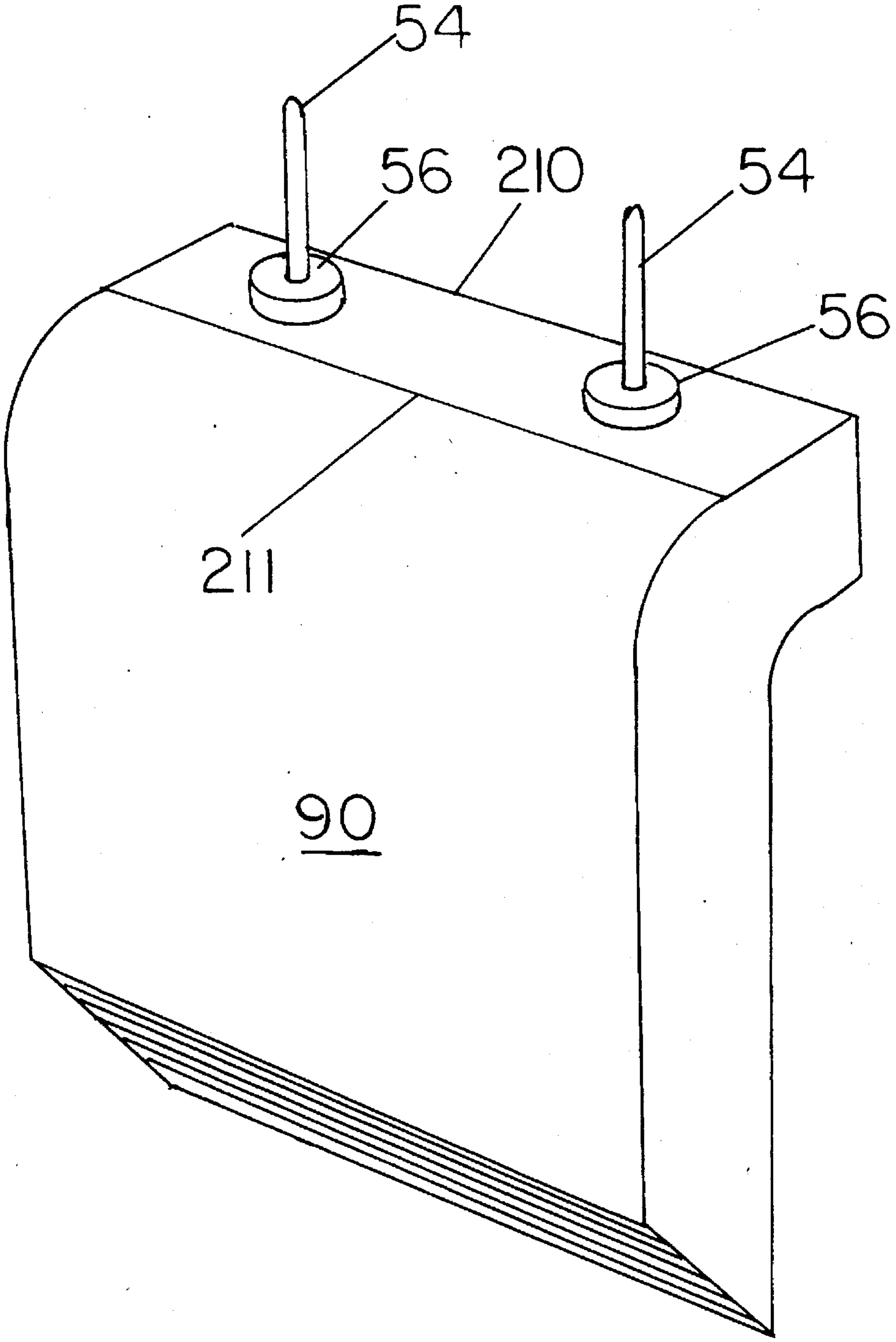
FIG. 3 shows a permanent wicket wire holding a stack of sidewelded bags.

FIG. 3 shows a completed stack of bags mounted on wicket wire 54. Bags 90 have a permanent U-shaped wicket wire 54 passing through the pre-punched openings 93. In the view of FIG. 3, however, openings 93 are located beneath rubber gromets 56. It is customary to secure bags 90 on the upstanding U-shaped wicket 54 with rubber gromets 56 pressed down onto wicket wire 54 as shown in FIG. 3.

Figure 4:
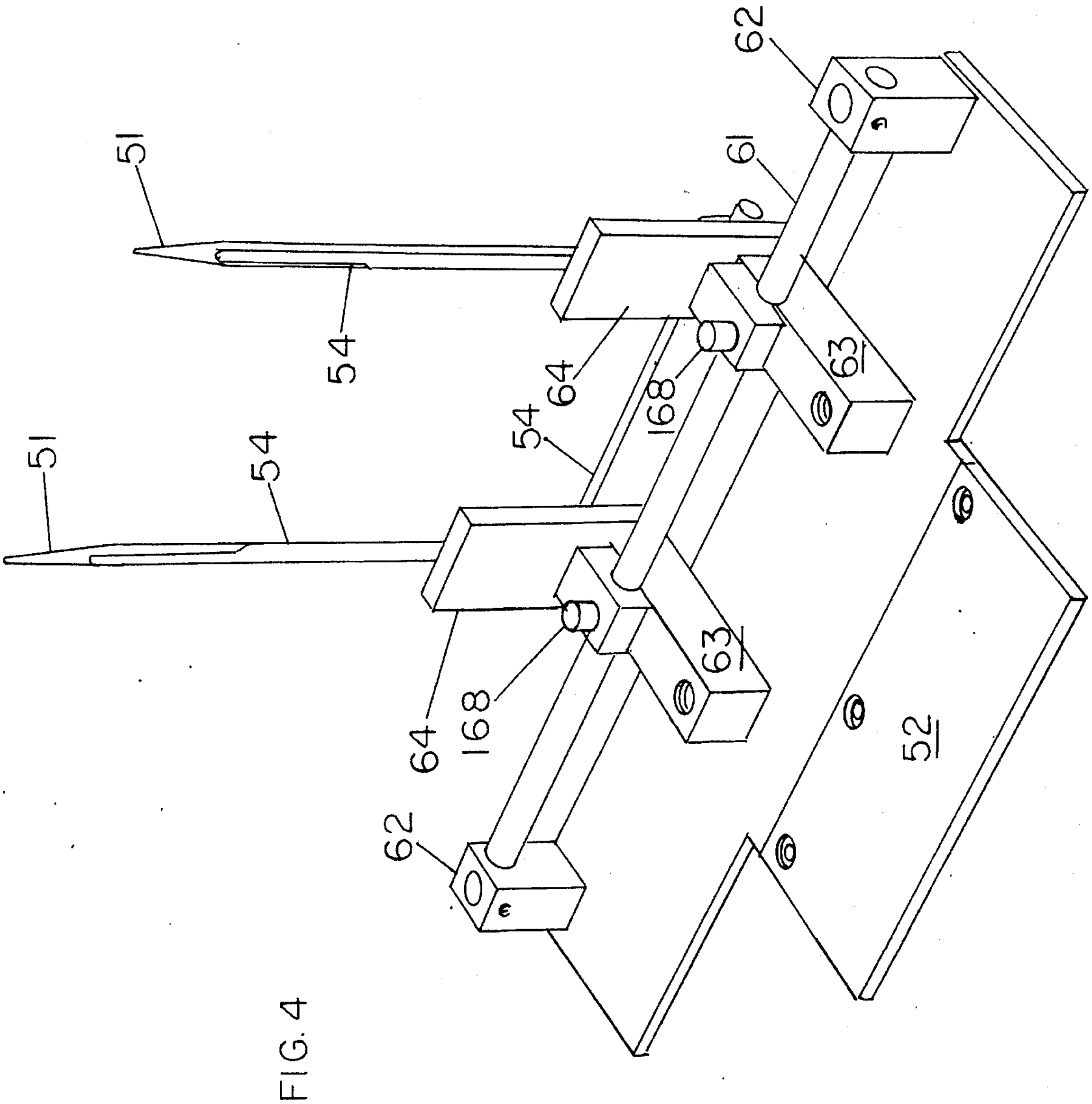
FIG. 4 shows the preferred embodiment of the permanent wicket wire holder of the present invention.

A wicket stacking assembly according to the present invention is shown in FIG. 4. Wicket stacking plate 52 is equipped with customary means, not shown in FIG. 4, for attaching stacking plate 52 to conveyer. Mounted towards either end of stacking plate 52 are mounting blocks 62 which support circular cross section rod 61. Mounted on rod 61 are wicket pin bases 63. Wicket pin bases 63 also carry transfer wicket pins 51 and clamp 70 for holding wire wickets 54 against transfer wicket pin 51. Both vertical sections and the horizontal section of wire wicket 54 are shown in FIG. 4, and the reference number 54 has been applied at each vertical and horizontal section in the Figure.

Figure 5:
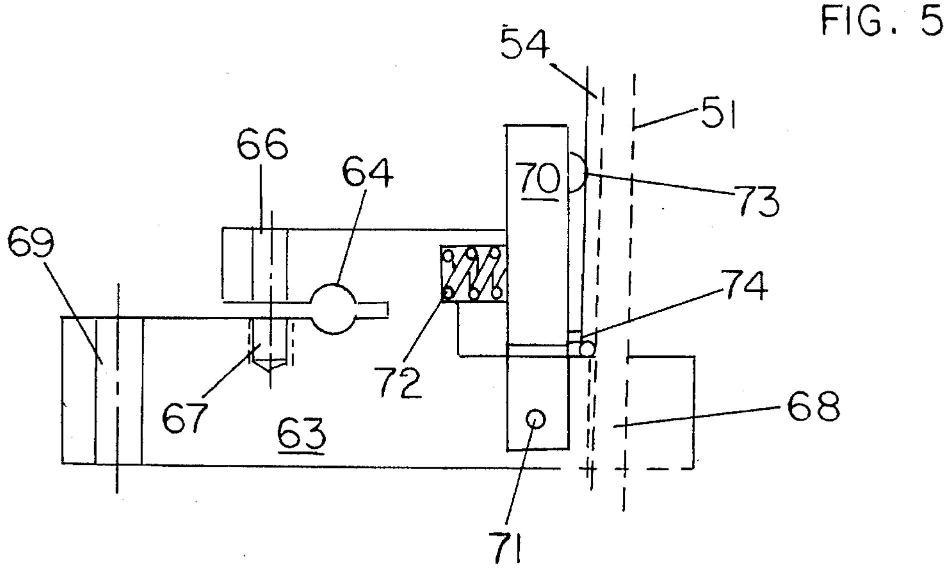
FIG. 5 shows a detail of a wicket pin base including a wicket wire clamp.

Detail of bases 63, which include biasing means 72 for holding the wickets in their pin, are shown in detail in FIG. 5. Base 63 contains an axial aperture 64 through which cylindrical mounting rod 61 passes. Also passing through aperture 64 is slot 65. The portion of base 63 above slot 65 has a clearance opening 66 through which a screw 168, not shown in FIG. 5, may pass into threaded opening 67 in the portion of base 63 immediately below slot 65. Tightening screw 168 which passes through opening 66 and into threaded opening 67, serves to clamp base 63 onto cylindrical rod 61. Also shown in FIG. 5 is aperture 68, through which transfer wicket pin 51 is placed. Although not shown in FIG. 5, provision is made for securing transfer wicket pin 51 into aperture 68 in base 63 by means of a set screw or other conventional device. A fourth aperture 162, also appears in base 63. A set screw or other conventional device passes through this threaded opening, and is used to rotate base 63 and transfer wicket pin 51 about cylindrical mounting rod 61 to adjust the tilt angle of the wicket pins.

Figure 6:
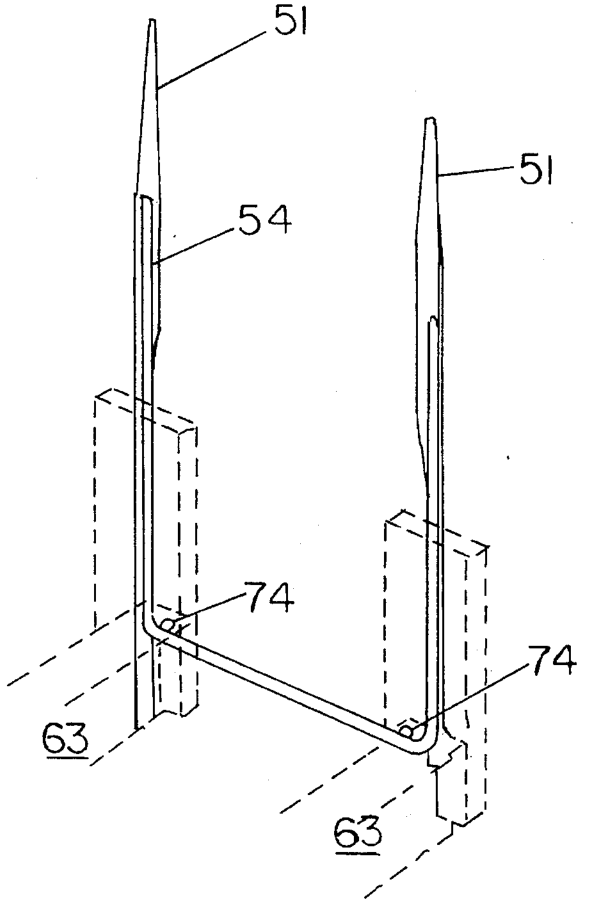
FIG. 6 shows a permanent wicket wire in place in the transfer wicket pins.

A clamp 70 for holding wicket wire 54 into transfer wicket pin 51 is also shown mounted on base 63. Clamp 70 is mounted to base 63 by pinned connection 71, which enables clamp 70 to rotate towards or away from transfer wicket pin 51 and wicket wire 54. Clamp 70 is biased towards pin 51 by compression spring 72, or other conventional biasing means. In its preferred embodiment, clamp 70 has a raised contact area 73, to hold wire wicket 54 into the hollowed out region of transfer wicket pin 51, and a locating boss 74, which may be a dowel pin or the point of a set screw, to securely hold the top surface of wicket wire 54 on the top surface of base 63. As shown in FIG. 6, which shows a wire wicket 54 in transfer wicket pins 51 along with the clamps 70 shown in phantom, clamps 70, in conjunction with locating boss 74 secures the lower end of the permanent wire wicket, while the upper end of the wire wicket is enclosed in the hollow recesses of transfer wicket pin 51 and held there by contact with raised contact area 73.

In operation, the use of the wire wickets 54 held in the clamping arrangement of the present invention provides significant operator ease. The operator, prior to starting the machine, will place a permanent wire wicket 54 into the grooves of transfer wicket pins 51, pressing the permanent wire wicket 54 downward to engage clamps 70 and locating boss 74. At this point, wire wicket 54 is securely held in place, and will be loaded with bags when the appropriate set of pins are presented at the stacking station. Following the completion of a full stack of bags at the stacking station, the transfer pins, 51 and their associated permanent wicket wire 54 will be indexed from the stacking station all as is conventional in the art. The operator will then reach down, grasping permanent wicket 54, and will simply lift wire wicket 54 with its stack of bags 90 free of the transfer pins 51 and clamp 70. At this point, all the operator must do is install rubber grommets 56 to hold the bags on the wicket. The operator will then install a new permanent wicket wire 54 into transfer pins 51 in anticipation of the next machine cycle.

While the present invention has been described in relation to its preferred embodiment, it will be apparent to those skilled in the art that other embodiments may be developed without departing from the scope of the claimed invention.

I claim:

1. An improved wicket stacking assembly comprising:

a) a wicket stacking plate, b) two upstanding transfer wicket pins having sections adapted to receive a permanent wicket wire, c) means for mounting said transfer wicket pins to said wicket stacking plate, d) clamp means mounted on said means for mounting adapted to hold said permanent wicket wire in said sections adapted to receive a permanent wicket wire.

2. An improved wicket stacking assembly according to claim 1 wherein said transfer wicket pins comprise a largely circular cross-section bluntly pointed pin grooved to receive the permanent wicket wire.

3. An improved wicket stacking assembly according to claim 2 wherein said clamp means further comprises a raised region to contact said permanent wicket wire and hold said permanent wicket wire against said largely circular cross-section bluntly pointed pin, the pin being grooved to receive the permanent wicket wire.

4. An improved wicket stacking assembly according to claim 3 wherein said clamp means further comprises a raised locating boss for retaining said permanent wicket wire against said means for mounting.

5. In a bag making machine having a wicket conveyor having multiple stacking stations which include upstanding pins for receiving and holding bags, the improvement comprising:

a) a wicket stacking plate, b) two upstanding transfer wicket pins having sections adapted to receive a permanent wicket wire, c) means for mounting said transfer wicket pins to said wicket stacking plate, d) clamp means mounted on said means for mounting adapted to hold said permanent wicket wire in said sections adapted to receive a permanent wicket wire.

6. In bag making machine according to claim 5 wherein said transfer wicket pin comprises a largely circular cross-section bluntly pointed pin grooved to receive the permanent wicket wire.

7. In a bag making machine according to claim 6 wherein said clamp means comprises a raised region to contact said permanent wicket wire and hold said permanent wicket wire against said largely circular cross-section bluntly pointed pin, the pin being grooved to receive the permanent wicket wire.

8. In a bag making machine according to claim 6 wherein said clamp means further comprises a raised locating boss for attaining said permanent wicket wire against said mounting means.

9. In a wicket stacking conveyor having stacking plate, upstanding transfer wicket pins, and means for mounting said transfer wicket pins to said stacking plate, the improvement comprising:

a) two upstanding transfer wicket pins having sections adapted to receive a permanent wicket wire, and b) clamp means mounted on said means for and adapted to hold said permanent wicket wire in said sections adapted to receive a permanent wicket wire in said transfer wicket pins.

10. A wicket stacking conveyor according to claim 9 further comprising a largely circular cross-section bluntly pointed transfer wicket pin grooved to receive the permanent wire wicket.

11. A wicket stacking conveyor according to claim 10 wherein said clamp means further comprises a raised region to contact said permanent wicket wire and hold said permanent wicket wire against said circular cross-section bluntly pointed pin, the pin being grooved to receive the permanent wicket wire.

12. A wicket stacking conveyor according to claim 11 wherein said clamp means further comprises a raised locating boss for retaining said permanent wicket wire against said means for mounting.

* * * * *